(12) United States Patent
Ishihara et al.

(10) Patent No.: US 7,823,978 B2
(45) Date of Patent: Nov. 2, 2010

(54) RECLINING DEVICE

(75) Inventors: Yoshitaka Ishihara, Ichinomiya (JP); Kazuyoshi Hara, Gifu (JP)

(73) Assignee: Kabushiki Kaisha Imasen Denki Seisakusho, Inuyama (JP)

( * ) Notice: Subject to any disclaimer, the term of this patent is extended or adjusted under 35 U.S.C. 154(b) by 292 days.

(21) Appl. No.: 12/033,410

(22) Filed: Feb. 19, 2008

(65) Prior Publication Data
US 2008/0211285 A1    Sep. 4, 2008

(30) Foreign Application Priority Data
Feb. 20, 2007    (JP)    ............................... 2007-039412

(51) Int. Cl.
*B60N 2/235*    (2006.01)
(52) U.S. Cl. ................................. 297/367 L; 297/367 P
(58) Field of Classification Search ............. 297/367 R, 297/367 L
See application file for complete search history.

(56) References Cited

U.S. PATENT DOCUMENTS

| | | | | |
|---|---|---|---|---|
| 6,554,361 B2* | 4/2003 | Reubeuze et al. | ....... | 297/367 R |
| 6,561,585 B2* | 5/2003 | Cilliere et al. | .......... | 297/367 R |
| 6,669,297 B2* | 12/2003 | Cilliere et al. | .......... | 297/367 R |
| 7,066,541 B2* | 6/2006 | Uramichi | ................ | 297/367 R |
| 7,100,987 B2* | 9/2006 | Volker et al. | ............ | 297/367 R |
| 7,204,555 B2* | 4/2007 | Thiel | ....................... | 297/367 R |
| 7,380,882 B2* | 6/2008 | Oki | ......................... | 297/367 R |
| 2003/0184143 A1* | 10/2003 | Cilliere et al. | .............. | 297/367 |
| 2006/0006718 A1* | 1/2006 | Umezaki | ..................... | 297/367 |
| 2006/0055222 A1* | 3/2006 | Bonk et al. | ................. | 297/367 |

FOREIGN PATENT DOCUMENTS

JP    2001157615    12/2001

* cited by examiner

*Primary Examiner*—Peter R. Brown
(74) *Attorney, Agent, or Firm*—Lucas & Mercanti, LLP

(57) ABSTRACT

The object of the invention is to provide a reclining device which improves engagement between a lock gear and a gear plate for reliable locking without requiring high dimensional accuracy. Four lock gears comprising a pair of first lock gears 40, and a pair of second lock gears 50 in which a gap between the second lock gear 50 and guide protrusions 12, 13 is larger than a gap between the first lock gear 40 and guide protrusions 11, 12 are adopted. Due to elastic function of a biasing member body 90a of an biasing member 90, both the second lock gears 50 are biased radially and inwardly and toward the guide protrusion 13 of the base plate 10.

2 Claims, 9 Drawing Sheets

RECLINING DEVICE

CROSS-REFERENCE TO RELATED APPLICATION

The present application claims priority under 35 U.S.C. §119 to Japanese Patent Application No. JP2007-039412. The contents of these applications are incorporated herein by reference.

TECHNICAL FIELD

The present invention relates to a reclining device for seat for adjusting an inclination angle of a seat back.

BACKGROUND ART

As a technique on a reclining device for seat for adjusting the inclination angle of a seat back, a reclining device is disclosed in, for example, Prior Art 1. This reclining device moves a plurality of lock gears which contact a cam radially and outwardly due to rotation of the cam so as to be guided by each guide protrusion of a base plate, thereby engaging an external tooth of each lock gear with an internal tooth of a gear plate. Thereby, the base plate fixed to a seat cushion and the gear plate fixed to the seat back are locked with respect to each other so as not to be rotatable. By adopting four lock gears, the number of the external teeth of the lock gears engaged with the internal teeth of the gear plate is increased to enhance the locking strength between the base plate and the gear plate.

[Prior Art 1] Patent Publication No. 3815537B is incorporated herein by reference.

However, when two pairs of four lock gears comprising a pair of first lock gears and a pair of second lock gears are employed as the above-mentioned lock gears, it is difficult to set the shape of the cam for biasing each of the lock gear radially and outwardly and high dimensional accuracy is required.

SUMMARY OF THE INVENTION

To solve the above-mentioned problem, an object of the present invention is to provide a reclining device which reliably lock by enhancing engagement between a lock gear and a gear plate without requiring high dimensional accuracy.

In order to achieve the above object, according to the present invention, a reclining device is comprised:

a base plate (10);

a gear plate (20) rotatably attached to the base plate, and having an internal tooth (21);

a pair of first lock gears (40) guided to be attached by first guide parts (11, 12) of the base plate so as to be movable only in the radial direction, and having an external tooth (41) capable of engaging with the internal tooth;

a pair of second lock gears (50) guided to be attached by second guide parts of the base plate so as to be movable only in the radial direction, and having an external tooth (51) capable of engaging with the internal tooth, a gap between the second lock gear and the second guide part (12,13) being larger than a gap between the first lock gear and the first guide part;

a cam (60) controlling radial and outward movement of the pair of first lock gears and the pair of second lock gears, and making the external tooth engage with the internal tooth; and a biasing member (90, 91, 92, 93) biasing the pair of second lock gears toward one of the second guide parts.

According to a first aspect of the invention, a pair of first lock gears and a pair of second lock gears in which a gap between the second lock gear and second guide parts is larger than a gap between the first lock gear and the first guide parts, and a pair of second lock gears are biased toward one of the second guide parts by a biasing member.

When four lock gears comprising the pair of first lock gears and the pair of second lock gears are adopted as lock gears, it is difficult to set the shape of the cam as described above, and high dimensional accuracy is required. Since some allowances for dimensional accuracy of the pair of second lock gears can be made by making the gap between the second lock gear and the second guide parts larger than the gap between the first lock gear and the first guide parts, it is possible to solve the problem that setting of the shape of the cam is difficult and high dimensional accuracy is required.

However, in the event that external teeth of the pair of second lock gears engage with internal teeth of the gear plate in an inclined manner by making the gap between the pair of second lock gears and the second guide parts larger, another problem that engagement is deteriorated and locking strength decreases occurs. Thus, by biasing the pair of second lock gears toward one of the second guide parts by use of biasing members, the pair of second lock gears radially moves along one of the second guide parts with rotation of the cam.

Thereby, even when the gap between the pair of second lock gears and the second guide parts is made larger as described above, the external teeth of the pair of second lock gears can engage with the internal teeth of the gear plate without any inclination. Therefore, engagement between the lock gears and the gear plate is improved for reliable locking without high dimensional accuracy.

According to a second aspect of the invention, the biasing member biases the pair of second lock gears toward one of the second guide parts as well as radially and inwardly.

When engagement between the external tooth of each lock gear and the internal tooth of the gear plate is released, a mechanism for biasing each lock gear radially and inwardly is necessary. Therefore, by biasing the pair of second lock gears radially and inwardly by the biasing members for biasing the pair of second lock gears toward one of the second guide parts, the number of members for biasing the pair of second lock gears radially and inwardly can be reduced. Therefore, engagement between the lock gears and the gear plate is improved for reliable locking without increasing the number of components.

The reclining device in accordance with the more preferred teaching of the present invention, wherein the biasing member has a biasing member body formed by bending a wire-like elastic material in a curved manner, and engages with the pair of second lock gears and a portion of the base plate opposed to the pair of second lock gears across one of the second guide parts so as to separate both ends of the biasing member body from each other.

For this reason, due to elastic function of the biasing member body itself of bringing both ends of the biasing member body into close proximity with each other, the second lock gear is biased toward one of the second guide parts as well as radially and inwardly. Therefore, with simple configuration, engagement between the lock gears and the gear plate is improved for reliable locking.

The reclining device in accordance with the more preferred teaching of the present invention, wherein the biasing member is located between the other of the second guide parts opposed to one of the second guide parts across the pair of second lock gears and the pair of second lock gears, and biases the a pair of second lock gear toward one of the second guide parts.

Thereby, since the pair of second lock gears are biased toward one of the second guide parts by the biasing members, even when the gap between the pair of second lock gears and the second guide parts is made larger as described above, the external teeth of the pair of second lock gears can engage with the internal teeth of the gear plate without any inclination. Therefore, with a simple configuration, engagement between the lock gears and the gear plate is improved for reliable locking.

According to a fifth aspect of the invention, the biasing member is located between the pair of second lock gears and the lever plate so as to make surface contact with the second lock gear and the lever plate.

When the cam is rotated to engage the external tooth of each lock gear with the internal tooth of the gear plate, the lever plate rotates integrally with the cam. When the lever plate rotates in this manner, the biasing member which makes surface contact with the lever plate is biased to move in the rotating direction of the lever plate due to the frictional force of the contact surface. Furthermore, the pair of second lock gears which make surface contact with the moving biasing member are biased in the moving direction of the biasing member (in the rotating direction of the lever plate), that is, toward one of the second guide parts due to the frictional force of the contact surface.

Thereby, even when the gap between the pair of second lock gears and the second guide parts is made larger as described above, the external teeth of the pair of second lock gears can engage with the internal teeth of the gear plate without any inclination. Therefore, with simple configuration, engagement between the lock gears and the gear plate is improved for reliable locking.

According to a sixth aspect of the invention, the biasing member is formed by bending toward a pair of second lock gears so that one end of the lever plate may make frictional contact with the pair of second lock gears.

For this reason, the pair of second lock gears is biased in the rotating direction of the lever plate of the second guide parts, that is, toward one of the second guide parts by the biasing members rotating with the lever plate. Thereby, even when the gap between the pair of second lock gears and the second guide parts is made larger as described above, the external teeth of the pair of second lock gears can engage with the internal teeth of the gear plate without any inclination. Therefore, with a simple configuration, engagement between the lock gears and the gear plate is improved for reliable locking without increasing the number of components.

PREFERRED EMBODIMENTS OF THE INVENTION

First Embodiment

Figure 1:
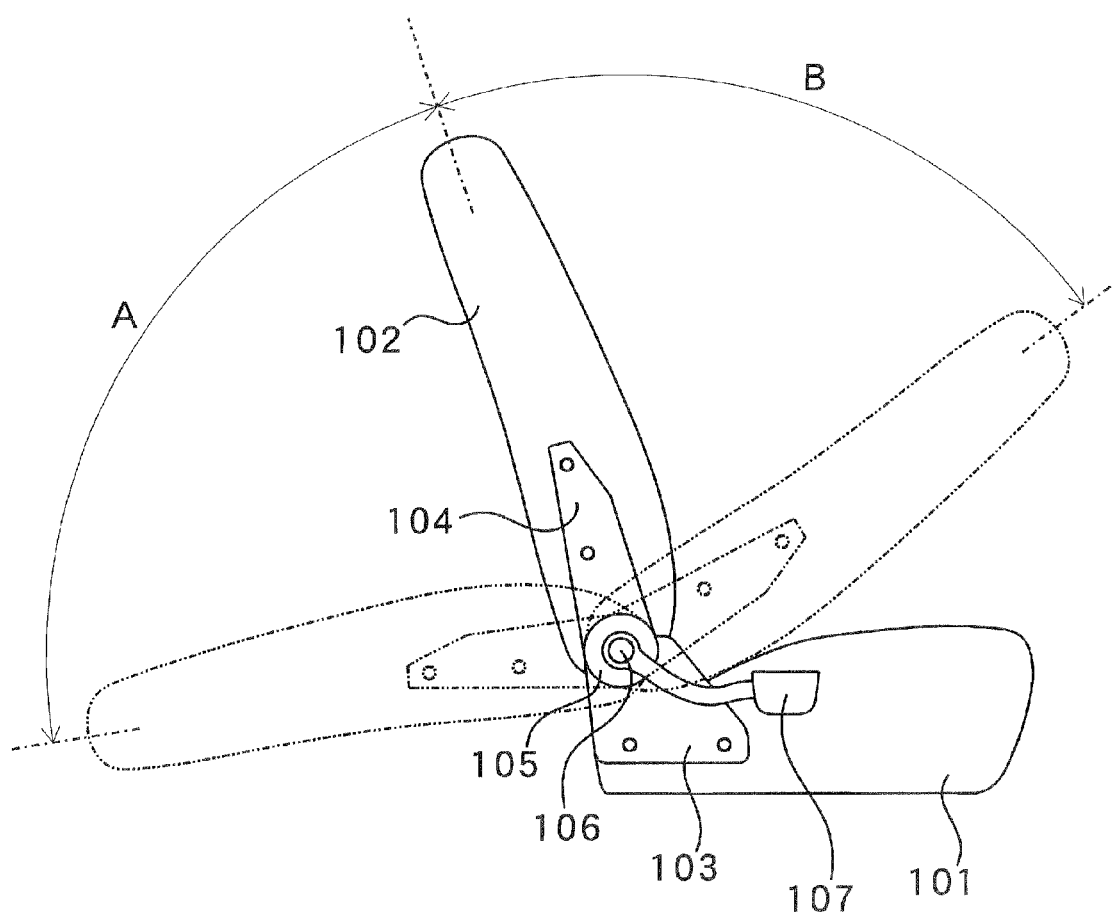
FIG. 1 is a side view showing a seat to which a reclining device in accordance with First embodiment of the present invention is attached.

Hereinafter, First embodiment of the present invention will be described with reference to figures. FIG. 1 is a side view showing a car seat to which a reclining device according to the present invention is attached.

As commonly known, the seat includes a seat cushion 101 and a seat back 102 as main components. A seat bracket (lower bracket) 103 is fixed to the seat cushion 101 and a seat back bracket (upper bracket) 104 is fixed to the seat back 102.

The lower bracket 103 and the upper bracket 104 each are fixed to a respective plate of a round reclining unit 105 so as to be rotatable with respect to each other. Thereby, the inclination angle of the seat back 102 is variable. A reclining operation lever 107 is attached to a center shaft 106 formed at the center of the round reclining unit 105. The round reclining unit 105, the center shaft 106 and the reclining operation lever 107 form the reclining device.

When the reclining operation lever 107 is pulled upwards, locking of the reclining device is released, enabling adjustment of the inclination angle of the seat back 102. The range of an angle A shown in FIG. 1 obtained by reclining the seat back 102 rearward is an inclination angle adjustment range in which the seat back 102 is locked at the position when the user moves his/her fingers off the reclining operation lever 107. The range of an angle B shown in FIG. 1 obtained by reclining the seat back 102 forward is a free rotational range in which an unlocked state is maintained even when the user moves his/her fingers off the reclining operation lever 107. As apparent from FIG. 1, the seat back 102 can rotate from the forward reclining position where the seat back 102 contacts the seat cushion 101 to the rearward reclining position where the seat back 102 is made flat with the seat cushion 101. A configuration of this reclining device will be described below.

Figure 2:
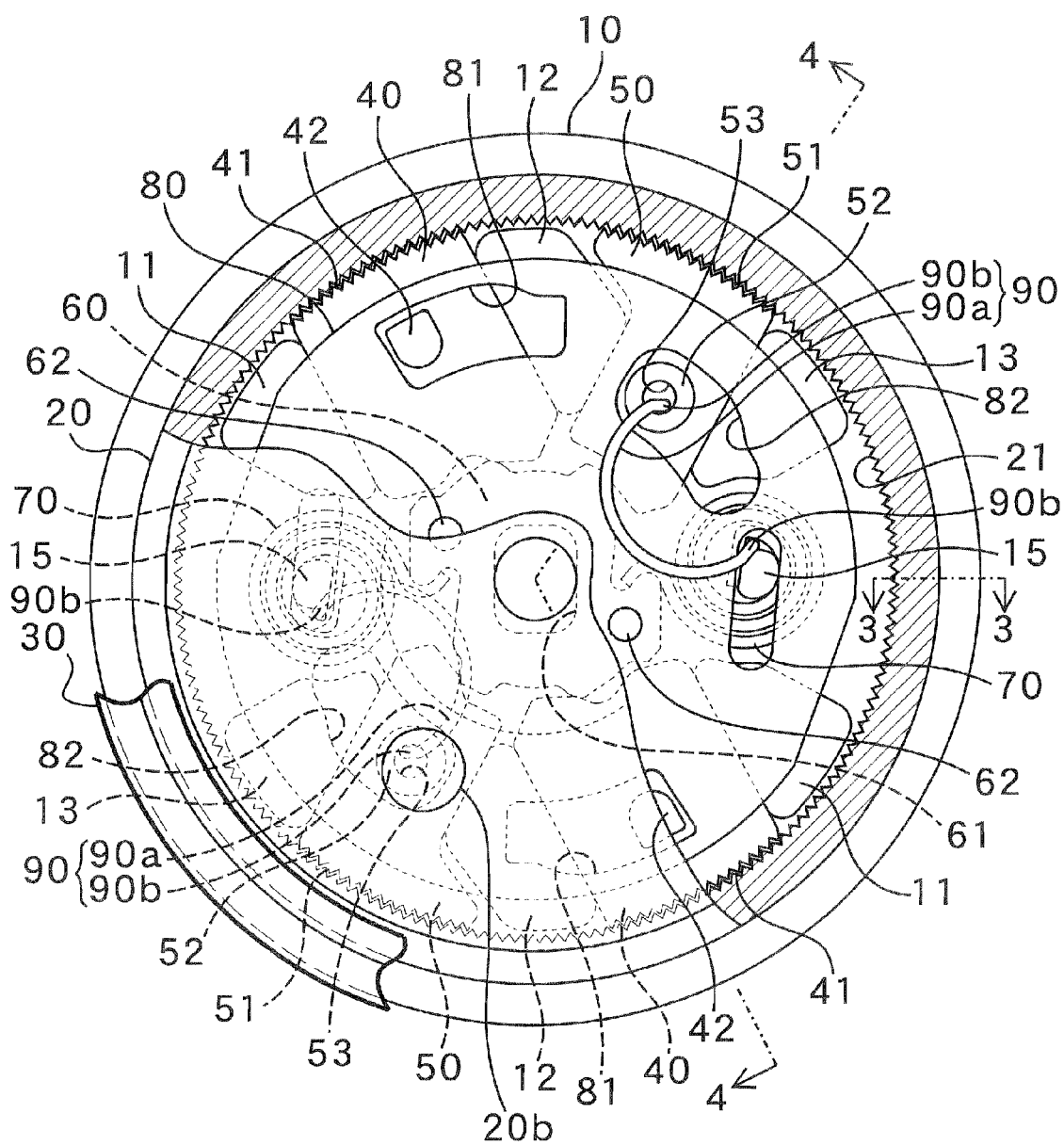
FIG. 2 is a partial cutaway plan view showing a round reclining unit of the reclining device.
Figure 3:
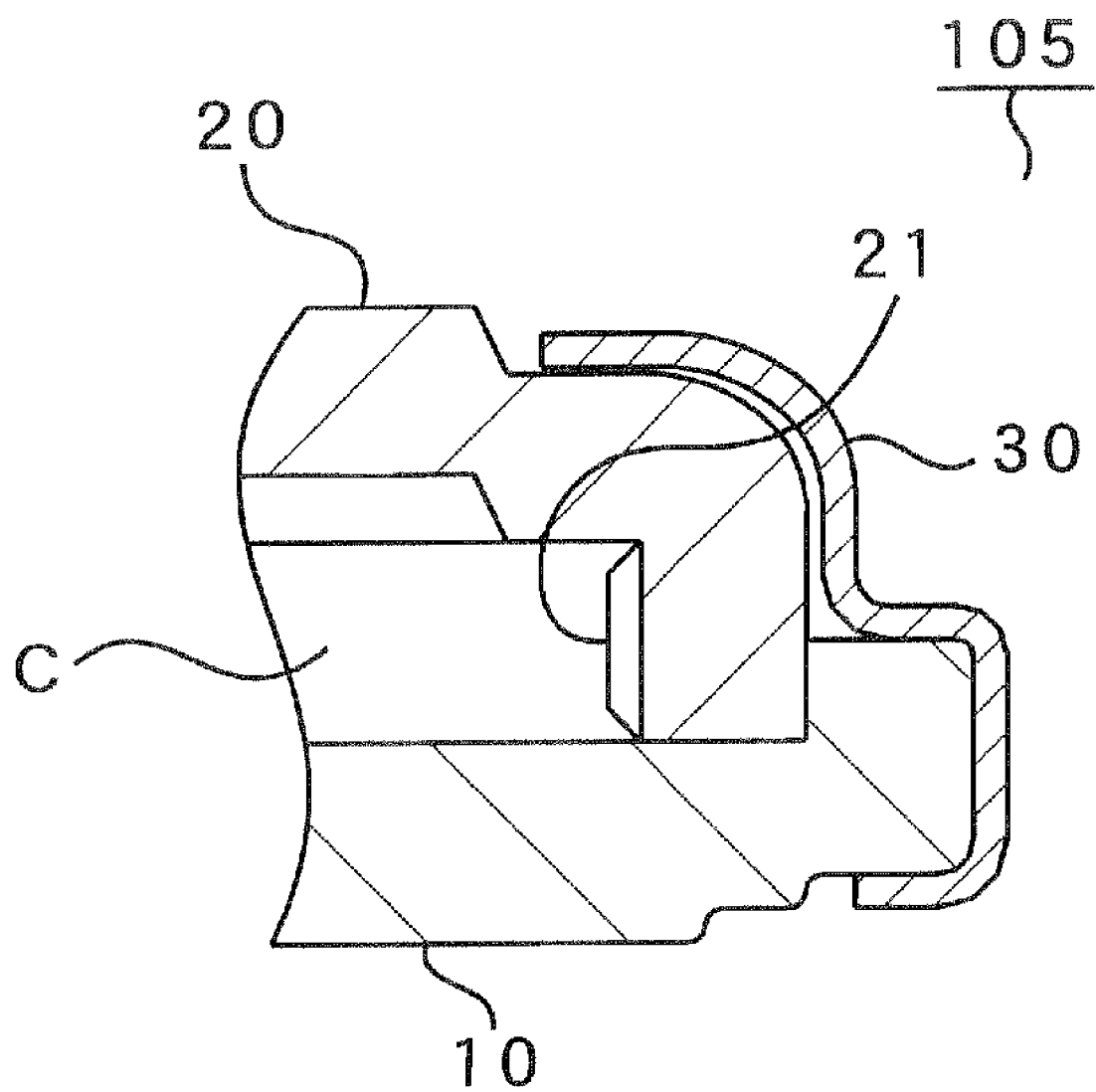
FIG. 3 is a sectional view showing a cutting plane taken along a line 3-3 in FIG. 2.

FIG. 2 is a partial cutaway plan view showing the round reclining unit 105 of the reclining device of the present invention, and FIG. 3 is a sectional view showing a cutting plane taken along a line 3-3 in FIG. 2. As shown in FIG. 3, the round reclining unit 105 is formed by stacking a substantially bowl-like gear plate 20 on a substantially disc-like base plate 10, and combining them into a single unit so as to be rotatable with respect to each other by crimping a side circumferential part of the unit with a bracket 30. An internal tooth 21 is formed throughout the inner circumferential surface of the gear plate 20.

A cavity (space) C exists between the base plate 10 and the gear plate 20. As shown in FIG. 2, locking or unlocking members such as four lock gears comprising a pair of first lock gears 40 and a pair of second lock gears 50, a center cam 60, two spiral springs 70, substantially disc-like lever plates 80 and two biasing members 90 are disposed in the cavity C.

Six guide protrusions 11, 12, 13, 11, 12, 13 are formed on the base plate 10 so as to be integral with the base plate 10 by press working. The lock gears 40, 50 are guided by linear sections (guide sections) of side circumferential parts of the guide protrusions 11, 12, 13 and supported so as to be slidable only in the radial direction.

External teeth 41, 51 which can engage with an internal tooth 21 of the gear plate 20 are formed on the outer circumferential sides of both the first lock gears 40 and both the second lock gears 50, respectively. To prevent interference with both the first lock gears 40, both the second lock gears 50 are formed so that its crosswise length on the inner circumferential side may be smaller than that on the outer circumferential side (near the external tooth 51). The crosswise length of both the second lock gears 50 on the inner circumferential side is formed so that a gap between the second lock gear 50 and the guide protrusions 12, 13 for guiding the second lock gear 50 may be larger than a gap between the first lock gear 40 and the guide protrusions 11, 12 for guiding the first lock gear 40.

Semilunar protrusions 15 are formed on the base plate 10 at the position opposite to both the second lock gears 50 through the guide protrusions 13 for guiding both the second lock gears 50, and one hook part of the spiral springs 70 is engaged with the semilunar protrusion 15.

A plate-like cam 60 having a rectangular hole 61 at the center thereof is rotatably disposed at the center of the base plate 10. A cam surface contacting a rear end surface of each of the lock gears 40, 50 and a hook engagement part engaging with the other hook part of each of both the spiral springs 70 are formed at both ends of the cam 60, respectively.

By being engaged with both the spiral springs 70, the cam 60 is strongly biased in the clockwise direction in figure. The cam 60 contacts the lock gears 40, 50 and strongly biases the lock gears 40, 50 radially and outwardly due to a biasing force of both the spiral springs 70 in the clockwise direction in figure.

By inserting the center shaft 106 shown in FIG. 1 into the rectangular hole 61 of the cam 60 and rotating the center shaft 106, the cam 60 can rotate in the counterclockwise direction in figure against the biasing force of both the spiral springs 70.

Two cylindrical protrusions 62 are formed on the cam 60 so as to protrude upwards in FIG. 2. Substantially cylindrical protrusions 42, 52 are formed on the lock gears 40, 50, respectively, so as to protrude upwards in figure. An engagement hole 53 for engaging with the biasing member 90 is formed on the protrusion 52. The lever plate 80 is mounted on the cam 60 and the lock gears 40, 50 from above.

Two holes engaging with both the protrusions 62 of the cam 60, respectively, are formed on the lever plate 80. By engaging the holes with the protrusions 62, the lever plate 80 rotates integrally with the cam 60. Two cam holes 81 and two cam holes 82 are also formed on the lever plate 80. The cam holes 81 engage with the protrusion 42 of the first lock gear 40, respectively, and the cam holes 82 engage with the protrusions 52 of the second lock gear 50.

When the lever plate 80 rotates with the cam 60 in the counterclockwise direction in figure, the inner circumferential edge of the cam hole 81 contacts the protrusion 42 of the first lock gear 40, and the inner circumferential edge of the cam hole 82 contacts the protrusion 52 of the second lock gear 50. When the lever plate 80 is rotated in the counterclockwise direction in figure, the protrusions 42, 52 are biased by the inner circumferential edges of the cam holes 81, 82 radially and inwardly, and the lock gears 40, 50 moves radially and inwardly.

Both the biasing members 90 are formed of a biasing member body 90a formed by bending a wire-like elastic material in a curved manner and two supporting ends 90b extending from both ends of the biasing member body 90a at a substantially right angle. Both the biasing members 90 are disposed so that the supporting ends 90b may engage with the engagement hole 53 and the semilunar protrusion 15 and the spiral spring 70 on the both second lock gear 50, respectively, so as to separate both ends of the biasing member body 90a from each other.

Thereby, both the second lock gears 50 are biased toward the guide protrusion 13 of the base plate 10 due to the elastic function of the biasing member body 90a itself of bringing both ends of the biasing member body 90a into close proximity with each other as well as biased radially and inwardly. A biasing force by the elastic function of the biasing member body 90a itself is sufficiently smaller than the biasing force of the cam 60 to both the second lock gears 50. The biasing member body 90a is not necessarily formed by bending the wire-like elastic material in a curved manner, and may be shaped so as to bring its both ends into close proximity with each other due to the elastic function of the biasing member body itself.

Figure 4:
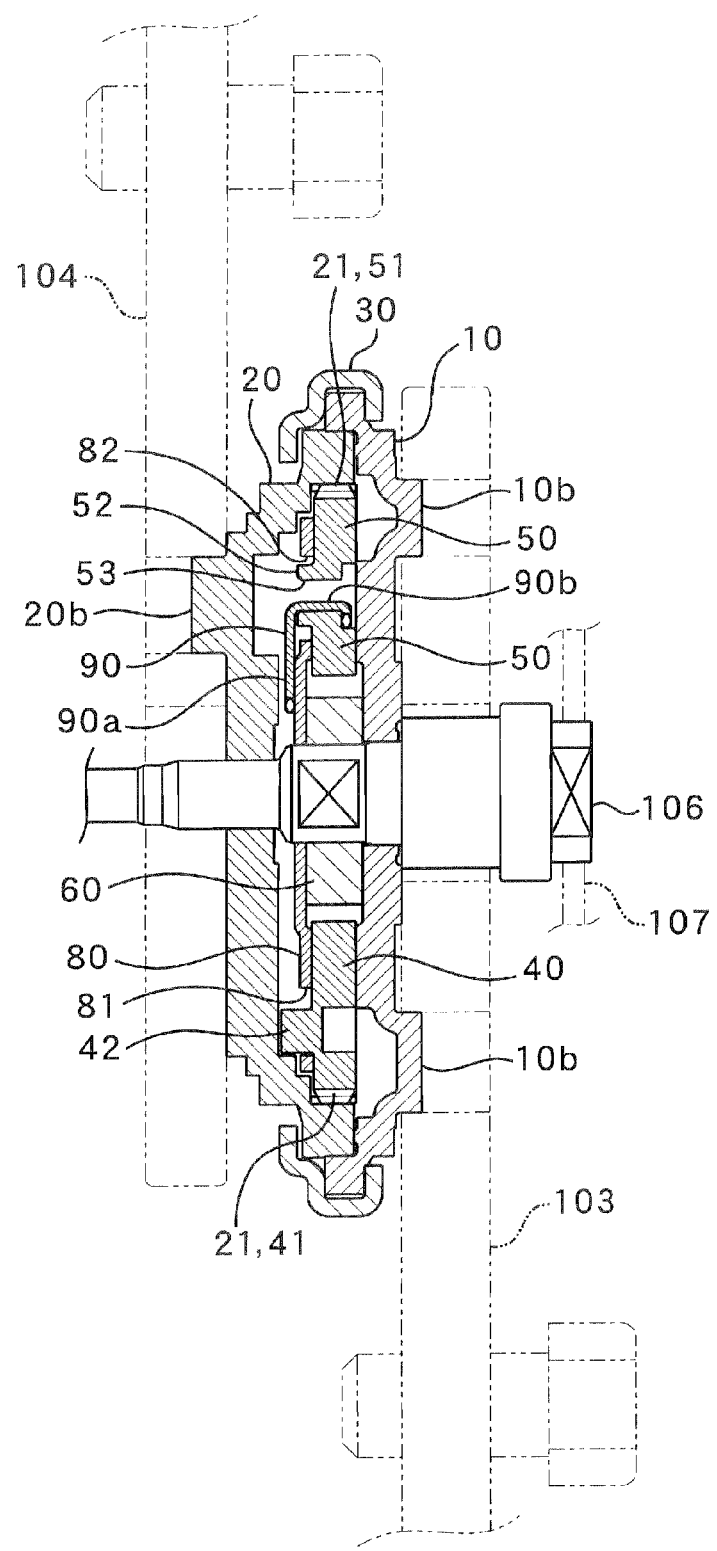
FIG. 4 is a sectional view showing a cutting plane taken along a line 4-4 in FIG. 2.

FIG. 4 is a sectional view showing a cutting plane taken along a line 4-4 in FIG. 2. FIG. 4 has a center shaft 106, which is not shown in FIG. 2. A spline part is formed at a front end of the center shaft 106, a rectangular hole insertion part (not shown in FIG. 4 and shown in FIG. 2) inserted into the rectangular hole 61 of the cam 60 is formed at the middle of the center shaft 106, and an operation lever attachment part is formed at a rear end of the center shaft 106.

As apparent from FIG. 3, the gear plate 20 is rotatably incorporated to the base plate 10 so that the outer circumferential surface of the gear plate 20 may slidingly contact the inner circumferential surface of the base plate 10, and the base plate 10 and the gear plate 20 are crimped with the bracket 30 into a single unit. The single unit comprising the base plate 10 and the gear plate 20 thus formed is referred to as a round reclining unit, and the round reclining unit into which the center shaft 106 is incorporated is referred to as a round reclining device. The reclining operation lever 107 is attached to the center shaft 106.

A plurality of circular protrusions 10b are formed on the back surface of the base plate 10 on the same circumference, and a plurality of circular protrusions 20b are formed on the back surface of the gear plate 20 on the same circumference (the circular protrusions 20b are also shown in FIG. 2). These circular protrusions 10b, 20b serve to attach the base plate 10 to the seat bracket (lower bracket) 103 or the seat back bracket (upper bracket) 104. Generally, the lower bracket 103 is attached to the base plate 10, thereby fixing the base plate 10 with the plurality of circular protrusions 10b so as not to rotate. The upper bracket 104 is attached to the gear plate 20 so that the gear plate 20 may rotate with inclination of the seat back by the plurality of circular protrusion 20b. As a matter of course, the bracket for the base plate 10 may be exchanged with the bracket for gear plate 20.

The unlocked state and the locked state of the reclining device thus configured in accordance with First embodiment will be described below.

(Unlocked State)

First, the unlocked state of the reclining device will be described.

When releasing locking to adjust the inclination angle of the seat back 102, the passenger operates the reclining operation lever 107 to rotate the center shaft 106 in the counterclockwise direction in figure. Then, the cam 60 rotates with the center shaft 106 in the counterclockwise direction in figure against the biasing force of both the spiral springs 70.

By thus rotating the cam 60 in the counterclockwise direction in figure, contact between the cam surface of the cam 60 and the rear end surface of each of the lock gears 40, 50 is released, thereby releasing the biasing force of the cam 60, which is applied to the lock gears 40, 50 radially and outwardly. Thus, the lock gears 40, 50 can move radially and inwardly, and engagement between the internal teeth 21 of the gear plate 20 and external teeth 41, 51 of the lock gears 40, 50 can be released.

Subsequently, since the lever plate 80 rotates with the cam 60 in the counterclockwise direction in figure, the inner circumferential edges of the cam holes 81, 82 on the lever plate 80 contact the protrusions 42, 52 of the lock gears 40, 50, respectively, thereby moving the lock gears 40, 50 radially and inwardly and thus releasing engagement between the internal teeth 21 and the external teeth 41, 51.

At this time, both the biasing members 90, as mentioned above, urge both the second lock gears radially and inwardly due to the elastic function of the biasing member body 90a itself. For this reason, both the second lock gears 50 are moved radially and inwardly, thereby releasing engagement between the internal tooth 21 and the external tooth 51.

As described above, when engagement between the internal teeth 21 and the external teeth 41, 51 is released, the gear plate 20 freely rotates, and the round reclining device is put into the unlocked state. When the round reclining device is put into the unlocked state, the reclining device is put into the unlocked state, and the inclination angle of the seat back 102 can be freely adjusted.

(Locked State)

Next, the locked state of the reclining device will be described.

When the passenger finishes adjustment of the inclination angle of the seat back 102, by loosening the reclining operation lever 107, the cam 60 rotates in the clockwise direction in figure due to the biasing force of both the spiral springs 70.

The cam surface of the rotating cam 60 contact the rear end surfaces of the lock gears 40, 50, thereby biasing the lock gears 40, 50 radially and outwardly. Thus, the lock gears 40, 50 move radially and outwardly so that the external teeth 41, 51 may engage with the internal teeth 21 of the gear plate 20.

At this time, both the biasing members 90 urge both the second lock gears 50 toward the guide protrusion 13 of the base plate 10 by the elastic function of the biasing member body 90a. Thus, both the second lock gears 50 are guided by the guide protrusion 13 to move radially and outwardly without being inclined, thereby smoothly engaging the external tooth 51 with the internal tooth 21 of the gear plate 20.

As described above, by engaging the external teeth 41, 51 of the lock gears 40, 50 with the internal teeth 21 of the gear plate 20, rotation of the gear plate 20 is restricted, and the round reclining device is put into the locked state.

As described above, the reclining device in accordance with First embodiment has a pair of first lock gears 40, and a pair of second lock gears 50, in which a gap between the second lock gear 50 and the guide protrusions 12, 13 is larger than a gap between the first lock gear 40 and the guide protrusions 11, 12. Both the second lock gears 50 are biased toward the guide protrusion 13 of the base plate 10 by both the biasing members 90.

When four lock gears comprising a pair of first lock gears 40 and a pair of second lock gears 50 are adopted as lock gears, as described above, it is difficult to set the shape of the cam 60, and high dimensional accuracy is required. Therefore, by making the gap between the second lock gear 50 and the guide parts 12, 13 larger than the gap between the first lock gear 40 and the guide parts 11, 12, some allowances for dimensional accuracy of the second lock gears 50 can be made. Thus, it is possible to solve the problem that setting of the shape of the cam 60 is difficult and high dimensional accuracy is required.

Furthermore, by biasing both the second lock gears 50 toward the guide parts 13 of the base plate 10 by both the biasing members 90, both the second lock gears 50 radially moves along the guide part 13 with rotation of the cam 60.

Thereby, even when the gap between both the second lock gears 50 and the respective guide parts 12, 13 of the base plate 10 is made larger, the external teeth 51 of both the second lock gears 50 can engage with the internal teeth 21 of the gear plate 20 without any inclination. Therefore, engagement between the lock gears 40, 50 and the gear plate 20 is improved for reliable locking without requiring high dimensional accuracy.

In the reclining device in accordance with First embodiment, both the biasing members 90 urge both the second lock gears 50 toward the guide part 13 of the base plate 10 as well as radially and inwardly.

By biasing both the second lock gears 50 radially and inwardly by both the biasing members 90 for biasing both the second lock gears 50 toward the guide part 13 of the base plate 10 in this manners the number of members for biasing both the second lock gears 50 radially and inwardly can be reduced. Therefore, engagement between the lock gears 40, 50 and the gear plate 20 is improved for reliable locking without increasing the number of components.

In the reclining device in accordance with First embodiment, both the biasing members 90 have the biasing member body 90a formed by bending the wire-like elastic material in a curved manner. The biasing member 90 engages the second lock gear 50 with the part between the semilunar protrusion 15 and the spiral spring 70, which are located as opposed to the second lock gear 50, through the guide part 13 so as to separate the supporting ends 90b of the biasing member body 90a from each other.

Thus, both the second lock gears 50 are biased radially and inwardly due to the elastic function of the biasing member body 90a itself for bringing the supporting ends 90b of the biasing member body 90a into close proximity with each other, and also biased toward the guide part 13 of the base plate 10. Therefore, with a simple configuration, engagement between the lock gears 40, 50 and the gear plate 20 is improved for reliable locking.

Second Embodiment

Figure 5:
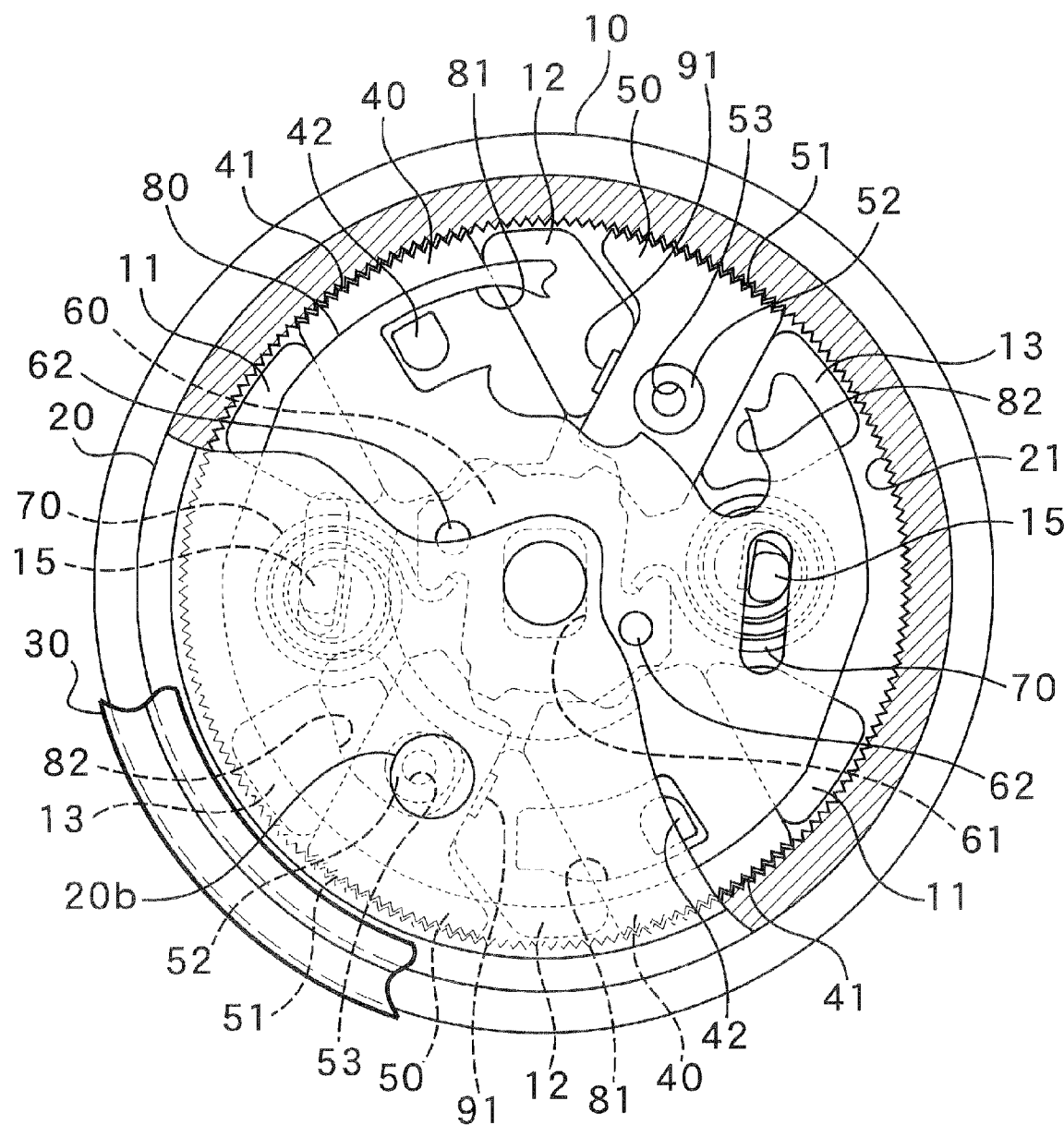
FIG. 5 is a sectional view showing main parts of a reclining device in accordance with Second embodiment of the present invention.

Next, Second embodiment of the present invention will be described with reference to FIG. 5. FIG. 5 is a sectional view showing main parts of a reclining device in accordance with Second embodiment of the present invention. The reclining device in accordance with Second embodiment is different from the reclining device in accordance with First embodiment in that two biasing members 91 are adopted in place of two biasing members 90, and elastic members not shown which are engaged with the engagement holes 53 of the second lock gear 50 and brings both the engagement hole 53 into close proximity with each other are adopted. Therefore, the same reference numerals are given to the same components as the components of the reclining device in First embodiment and description of the components are omitted.

Both the biasing members 91 are, for example, flat plate-like elastic members made of synthetic resin and each are attached to the respective guide protrusion 12 so as to be located in the gap between the second lock gear 50 and the guide protrusion 12 of the base plate 10 (Refer to FIG. 5). Thus, both the biasing members 91 urge both the second lock gears 50 toward the guide protrusion 13 opposed to the guide protrusion 12 across the second lock gear 50 due to the elastic function of both the biasing members 91. Both the second lock gears 50 are biased radially and inwardly by the above-mentioned elastic members not shown.

The unlocked state and the locked state of the reclining device thus configured in accordance with Second embodiment will be described below.

(Unlocked State)

First, the unlocked state of the reclining device will be described.

By rotating the cam 60 in the counterclockwise direction in figure in this manner, the biasing force of the cam 60 for biasing the lock gears 40, 50 radially and outwardly is released and thus, engagement between the internal teeth 21 of the gear plate 20 and the external teeth 41, 51 of the lock gears 40, 50 can be released. Then, by rotating the lever plate 80 in the counterclockwise direction in figure with rotation of the cam 60, the lock gears 40, 50 are moved radially and inwardly, thereby releasing engagement between the internal teeth 21 and the external teeth 41, 51. At this time, since the second lock gear 50 is biased radially and inwardly by the above-mentioned elastic member not shown, engagement between the internal tooth 21 and the external tooth 51 is smoothly released. Thereby, the gear plate 20 can be freely rotated and the round reclining device is put into the unlocked state.

(Locked State)

Next, the locked state of the reclining device will be described.

By rotating the cam 60 in the clockwise direction in figure due to the biasing force of both the spiral springs 70 as described above, the lock gears 40, 50 move radially and outwardly. At this time, the biasing member 91 biases the second lock gear 50 toward the guide protrusion 13 of the base plate 10 by the elastic function of the biasing member 91. Thus, the second lock gear 50 is guided by the guide protrusion 13 to move radially and outwardly without any inclination, thereby smoothly engaging the external tooth 51 with the internal tooth 21 of the gear plate 20. By engaging the external teeth 41, 51 of the lock gears 40, 50 with the internal teeth 21 of the gear plate 20 in this manner, rotation of the gear plate 20 is restricted and the round reclining device is put into the locked state.

As described above, in the reclining device in accordance with Second embodiment, the biasing member 91 is located between the second lock gear 50 and the guide protrusion 12, and biases the second lock gears 50 toward the guide protrusion 13 which is opposed to the guide protrusion 12 across the second lock gear 50.

Since both the second lock gears 50 are biased toward the guide protrusion 13 of the base plate 10 by the biasing member 91, as described above, even when the gap between the second lock gear 50 and the guide protrusions 12, 13 of the base plate 10 is made larger, the external tooth 51 of the second lock gear 50 can engage with the internal tooth 21 of the gear plate 20 without any inclination. Therefore, with a simple configuration, engagement between the lock gears 40, 50 and the gear plate 20 is improved for reliable locking.

Third Embodiment

Figure 6:
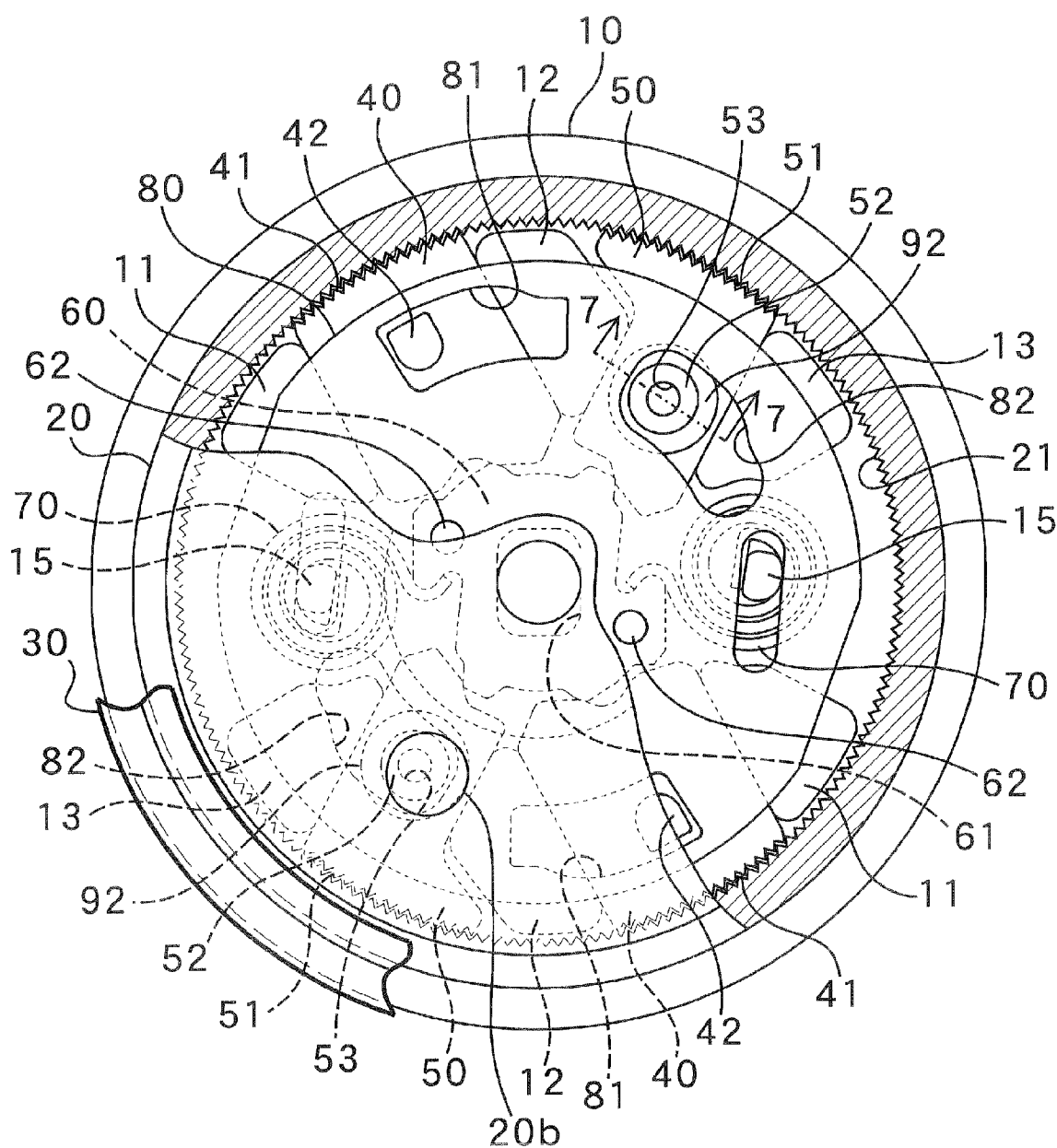
FIG. 6 is a sectional view showing main parts of a reclining device in accordance with Third embodiment of the present invention.
Figure 7:
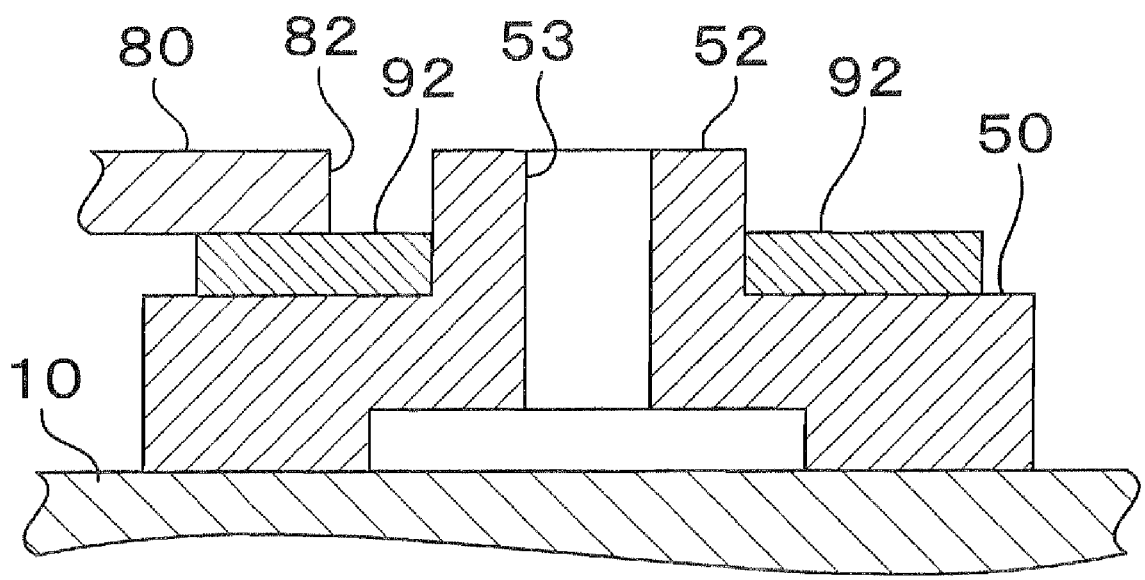
FIG. 7 is a sectional view showing a cutting plane taken along a line 7-7 in FIG. 6.

Next, Third embodiment of the present invention will be described with reference to FIG. 6 and FIG. 7. FIG. 6 is a sectional view showing main parts of a reclining device in accordance with Third embodiment of the present invention. FIG. 7 is a sectional view showing a cutting plane taken along a line 7-7 in FIG. 6. The reclining device in accordance with Third embodiment is different from the reclining device in accordance with First embodiment in that two biasing members 92 are adopted in place of two biasing members 90 and elastic members not shown which are engaged with the engagement holes 53 of the second lock gear 50 and brings both the engagement hole 53 into close proximity with each other are adopted. Therefore, the same reference numerals are given to the same components as the components of the reclining device in First embodiment and description of the components are omitted.

Both the biasing members 92 are, for example, annular elastic members made of synthetic resin. Each biasing member 92 is located between the second lock gear 50 and the lever plate 80 so as to engage with the protrusion 52 of the second lock gear 50 on its inner circumferential surface, and contact both the second lock gear 50 and the lever plate 80 (Refer to FIG. 6 and FIG. 7). Both the second lock gears 50 are biased radially and inwardly by the above-mentioned elastic members not shown.

The unlocked state and the locked state of the reclining device thus configured in accordance with Third embodiment will be described below.

(Unlocked State)

First, the unlocked state of the reclining device will be described.

By rotating the cam 60 in the counterclockwise direction in figure as described above, the biasing force of the cam 60 of biasing the lock gears 40, 50 radially and outwardly is released and thus, engagement between the internal teeth 21 of the gear plate 20 and the external teeth 41, 51 of the lock gears 40, 50 can be released. Then, by rotating the lever plate 80 in the counterclockwise direction in figure with rotation of the cam 60, the lock gears 40, 50 are moved radially and inwardly, thereby releasing engagement between the internal teeth 21 and the external teeth 41, 51. At this time, since both the second lock gears 50 are biased radially and inwardly by the above-mentioned elastic members not shown, engagement between the internal tooth 21 and the external tooth 51 is smoothly released. Thereby, the gear plate 20 freely rotates and the round reclining device is put into the unlocked state.

(Locked State)

Next, the locked state of the reclining device will be described.

By rotating the cam 60 in the clockwise direction in figure due to the biasing force of both the spiral springs 70 as described above, the lock gears 40, 50 moves radially and outwardly. At this time, by rotating the lever plate 80 together with the cam 60 in the clockwise direction in figure, the biasing member 92, surface of which contacts the lever plate 80, is biased by a frictional force on the contact surface to move in the rotating direction of the lever plate 80. Furthermore, the second lock gear 50 which make surface contact the moving biasing member 92 is biased in the moving direction of the biasing member 92, that is, toward the guide protrusion 13 of the base plate 10 by the frictional force on the contact surface. Due to this biasing force, the second lock gear 50 is guided by the guide protrusion 13 to move radially and outwardly without any inclination, thereby smoothly engaging the external tooth 51 with the internal tooth 21 of the gear plate 20. By engaging the external teeth 41, 51 of the lock gears 40, 50 with the internal teeth 21 of the gear plate 20 in this manner, rotation of the gear plate 20 is restricted and the round reclining device is put into the locked state.

As described above, in the reclining device in accordance with Third embodiment, both the biasing members 92 are located between the second lock gear 50 and the lever plate 80 so as to make surface contact with both the second lock gear 50 and the lever plate 80.

For this reason, both the second lock gears 50 are biased toward the guide protrusion 13 as a guide part on the side of the moving direction of the biasing members 92 (the side of the rotating direction of the lever plate 80) due to the frictional force occurred between both the biasing members 92 biased in the rotating direction of the lever plate 80. Thus, even when the gap between the second lock gear 50 and the guide protrusions 12, 13 of the base plate 10 as described above is made larger, the external teeth 51 of both the second lock gears 50 can engage with the internal teeth 21 of the gear plate 20 without any inclination. Therefore, with a simple configuration, engagement between the lock gears 40, 50 and the gear plate 20 is improved for reliable locking.

Fourth Embodiment

Figure 8:
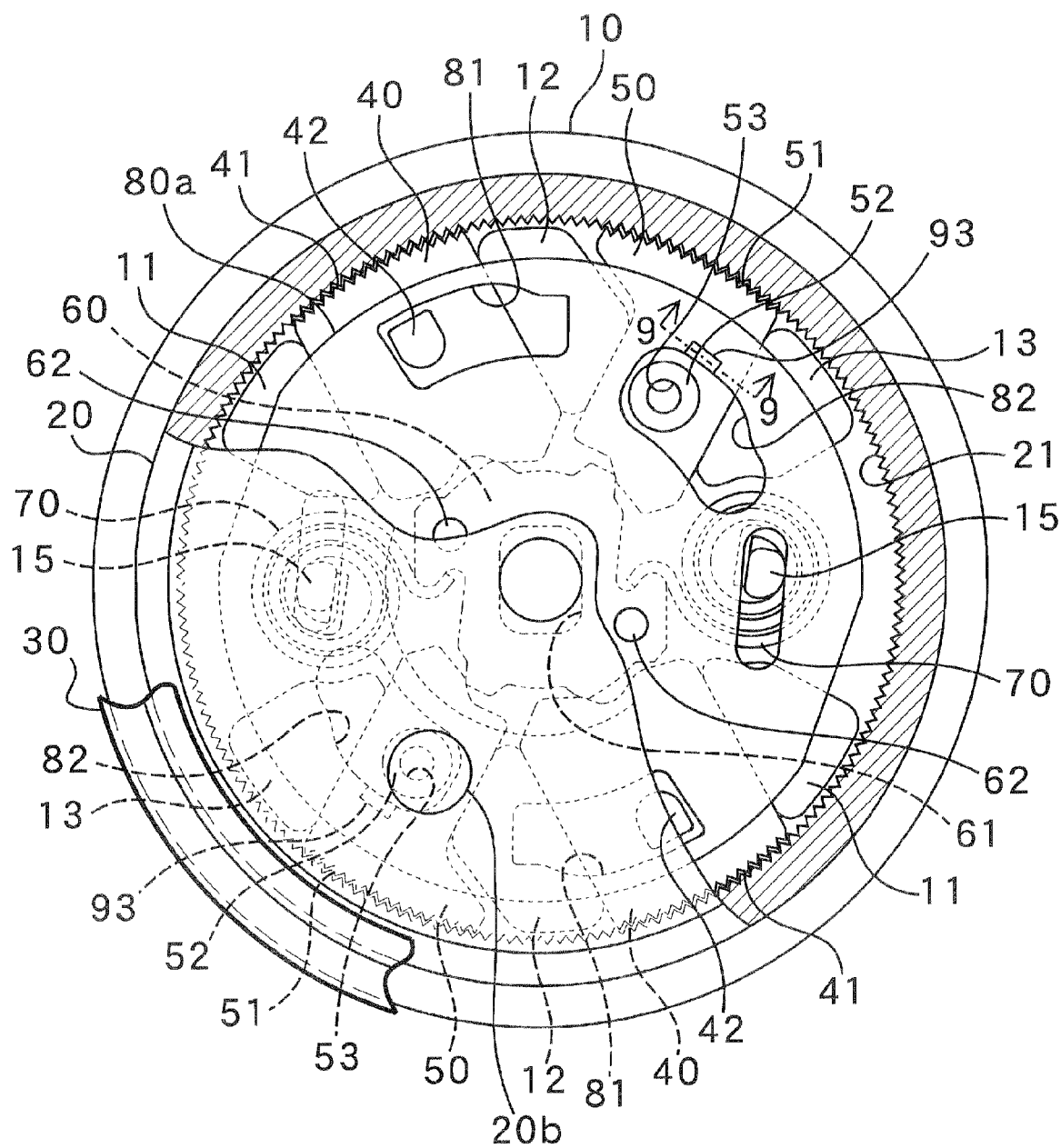
FIG. 8 is a sectional view showing main parts of a reclining device in accordance with Fourth embodiment of the present invention.
Figure 9:
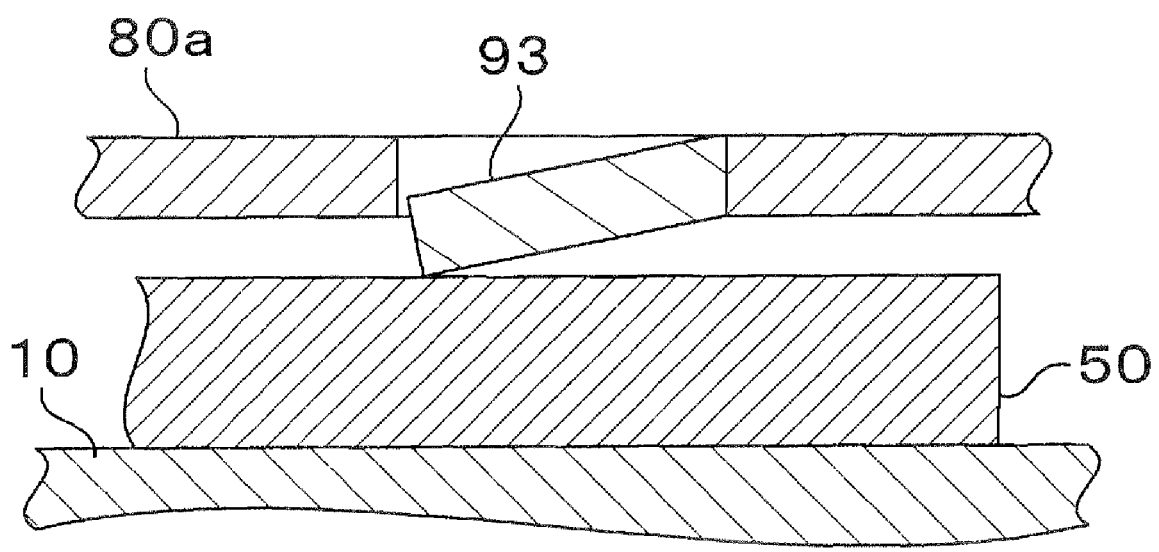
FIG. 9 is a sectional view showing a cutting plane taken along a line 9-9 in FIG. 8.

Next, Fourth embodiment of the present invention will be described with reference to FIG. 8 and FIG. 9. FIG. 8 is a sectional view showing main parts of a reclining device in accordance with Fourth embodiment of the present invention. FIG. 9 is a sectional view showing a cutting plane taken along a line 9-9 in FIG. 8. The reclining device in accordance with Fourth embodiment is different from the reclining device in accordance with First embodiment in that the two biasing members 90 are omitted, a lever plate 80a is adopted in place of the lever plate 80 and elastic members not shown which are engaged with the engagement holes 53 of the second lock gear 50 and brings both the engagement hole 53 into close proximity with each other are adopted. Therefore, the same reference numerals are given to the same components as the components of the reclining device in First embodiment and description of the components are omitted.

A notched part 93 is formed on the lever plate 80a. The notched part 93 is formed by bending toward the second lock gear 50 so that one end of the cam hole 82 on the lever plate 80a may make frictional contact with the second lock gear 50 (Refer to FIG. 8 and FIG. 9).

The notched part 93 is formed so as not to make frictional contact with the second lock gear 50 when the inner circumferential edge of the cam hole 82 contacts the protrusion 52 of the second lock gear 50 by rotation of the lever plate 80a in the counterclockwise direction in figure. Both the second lock gears 50 are biased radially and inwardly by the above-mentioned elastic members not shown.

The unlocked state and the locked state of the reclining device thus configured in accordance with Fourth embodiment will be described below.

(Unlocked State)

First, the unlocked state of the reclining device will be described.

By rotating the cam 60 in the counterclockwise direction in figure as described above, the biasing force of the cam 60 of biasing the lock gears 40, 50 radially and outwardly is released and thus, engagement between the internal teeth 21 of the gear plate 20 and the external teeth 41, 51 of the lock gears 40, 50 can be released. Then, by rotating the lever plate 80a in the counterclockwise direction in figure with rotation of the cam 60, the lock gears 40, 50 are moved radially and inwardly, thereby releasing engagement between the internal teeth 21 and the external teeth 41, 51. At this time, since both the second lock gears 50 are biased radially and inwardly by the above-mentioned elastic members not shown, engagement between the internal tooth 21 and the external tooth 51 is smoothly released. Thereby, the gear plate 20 freely rotates and the round reclining device is put into the unlocked state.

(Locked State)

Next, the locked state of the reclining device will be described.

By rotating the cam 60 in the clockwise direction in figure due to the biasing force of both the spiral springs 70 as described above, the lock gears 40, 50 move radially and outwardly. At this time, by rotating the lever plate 80a together with the cam 60 in the clockwise direction in figure, the notched part 93 makes frictional contact with the second lock gear 50, thereby biasing the second lock gear 50 in the clockwise direction in figure, that is, toward the guide protrusion 13. Due to this biasing force, the second lock gear 50 is guided by the guide protrusion 13 to move radially and outwardly without any inclination, thereby smoothly engaging the external tooth 51 with the internal tooth 21 of the gear plate 20. By engaging the external teeth 41, 51 of the lock gears 40, 50 with the internal teeth 21 of the gear plate 20 in this manner, rotation of the gear plate 20 is restricted and the round reclining device is put into the locked state.

As described above, in the reclining device in accordance with Fourth embodiment, the notched part 93 of the lever plate 80a is formed by bending toward the second lock gear 50 so that one end of the lever plate 80a may make frictional contact with the second lock gear 50.

For this time, both the second lock gears 50 are biased toward the guide protrusion 13 as a guide part on the side of the rotating direction of the lever plate 80 by the notched part 93 rotating with the lever plate 80a. Thus, even when the gap between the second lock gear 50 and the guide protrusions 12, 13 of the base plate 10 as described above is made larger, the external teeth 51 of both the second lock gears 50 can engage with the internal teeth 21 of the gear plate 20 without any inclination. Therefore, with simple configuration engagement between the lock gears 40, 50 and the gear plate 20 is improved for reliable locking.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

The invention claimed is:

1. A reclining device for a seat for adjusting inclination between a back cushion and seat cushion of the seat, comprising:

a base plate attachable to one of the back cushion and the seat cushion;

a gear plate rotatably attached to the base plate, and having internal teeth, the gear plate attachable to the other of the back cushion and the seat cushion;

a pair of first lock gears guided to be attached by first guide parts of the base plate so as to be movable only in the radial direction, and having external teeth capable of engaging with the internal teeth;

a pair of second lock gears guided to be attached by second guide parts of the base plate so as to be movable only in the radial direction, and having external teeth capable of engaging with the internal teeth, a gap between the second lock gears and the second guide parts being larger than a gap between the first lock gears and the first guide parts;

a cam mounted on the base plate and controlling radial and outward movement of the pair of first lock gears and the pair of second lock gears, and making the external teeth engage the internal teeth; and a pair of biasing members, each of the biasing members biasing one of the pair of second lock gears toward one of the second guide parts, each of the pair of biasing members having a biasing member body formed by bending a wire-like elastic material in a curved manner, and each of biasing members engages with one of the pair of second lock gears and a portion of the base plate opposed to the pair of second lock gears across one of the second guide parts so as to separate both ends of the biasing member body from each other.

2. The reclining device according to claim 1, wherein the biasing member biases the pair of second lock gears toward one of the second guide parts as well as radially and inwardly.

* * * * *